(12) United States Patent
Fredriksson et al.

(10) Patent No.: US 11,679,390 B2
(45) Date of Patent: Jun. 20, 2023

(54) TORQUE REACTION PULLEY FOR AN INERTIA CONE CRUSHER

(71) Applicant: SANDVIK INTELLECTUAL PROPERTY AB, Sandviken (SE)

(72) Inventors: Magnus Fredriksson, Dalby (SE); Martin Holstein, Limhamn (SE); Johan Gunnarsson, Sovde (SE); Jonas Lindvall, Lund (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 149 days.

(21) Appl. No.: 17/308,206

(22) Filed: May 5, 2021

(65) Prior Publication Data
US 2021/0252519 A1   Aug. 19, 2021

Related U.S. Application Data

(62) Division of application No. 16/062,699, filed as application No. PCT/EP2015/080433 on Dec. 18, 2015, now abandoned.

(51) Int. Cl.
*B02C 2/04* (2006.01)
*F16F 15/12* (2006.01)
*F16H 55/36* (2006.01)

(52) U.S. Cl.
CPC .......... *B02C 2/042* (2013.01); *F16F 15/1201* (2013.01); *F16H 55/36* (2013.01); *F16H 2055/366* (2013.01)

(58) Field of Classification Search
CPC ... F16H 55/36; F16H 2055/366; B02C 2/042; F16D 3/76; Y10T 74/2131; F16F 15/1201

USPC .......................................................... 474/94
See application file for complete search history.

(56) References Cited

U.S. PATENT DOCUMENTS

| | | | | |
|---|---|---|---|---|
| 1,751,007 A * | 3/1930 | Kreissig | ............... | B60B 17/0055 301/10.1 |
| 1,894,432 A * | 1/1933 | Watson | ..................... | E21B 1/02 254/327 |
| 2,898,142 A * | 8/1959 | Kordes | ............... | B60B 17/0048 29/894.012 |
| 3,304,924 A * | 2/1967 | Dolza | ..................... | F16H 55/30 123/90.31 |
| 3,719,098 A * | 3/1973 | Graves | ................... | B65G 23/06 474/272 |
| 3,741,025 A * | 6/1973 | Russell | ................... | F16H 55/36 474/902 |
| 4,080,008 A * | 3/1978 | Groff | ................. | B62D 55/0963 474/94 |
| 4,413,981 A * | 11/1983 | White | ..................... | F16H 55/50 474/902 |
| 4,568,031 A * | 2/1986 | Mitrofanov | ............. | B02C 2/042 241/210 |
| 4,619,156 A * | 10/1986 | Kiryu | ..................... | F16H 49/001 74/640 |
| 4,795,012 A * | 1/1989 | Durum | ................ | F16F 15/1213 464/99 |
| 5,147,246 A * | 9/1992 | Focqueur | ................ | F16D 13/68 464/59 |

(Continued)

*Primary Examiner* — Henry Y Liu
(74) *Attorney, Agent, or Firm* — Corinne R. Gorski

(57) ABSTRACT

A torque reaction pulley for an inertia cone crusher having an elastically deformable component responsive to a change in torque through the drive transmission of the crusher due to rotation of an unbalanced weight within the crusher.

13 Claims, 6 Drawing Sheets

(56) References Cited

U.S. PATENT DOCUMENTS

| | | | | |
|---|---|---|---|---|
| 5,377,962 A * | 1/1995 | Ochs | F16D 3/50 | 267/281 |
| 5,697,848 A * | 12/1997 | Bosley | H02K 7/16 | 464/182 |
| 5,797,474 A * | 8/1998 | Nakane | F16F 15/1213 | 464/59 |
| 6,106,421 A * | 8/2000 | Graber | F16H 55/36 | 474/94 |
| 6,364,774 B1 * | 4/2002 | Kimura | F16D 3/62 | 464/59 |
| 6,494,799 B1 * | 12/2002 | Ochiai | F16D 7/044 | 474/94 |
| 6,702,681 B1 * | 3/2004 | Ochs | F16H 55/36 | 464/7 |
| 7,025,680 B2 * | 4/2006 | Tabuchi | F16F 15/10 | 474/70 |
| 7,048,661 B2 * | 5/2006 | Shibata | F16D 3/68 | 474/70 |
| 7,121,947 B2 * | 10/2006 | Ueda | F16D 47/02 | 464/10 |
| 7,455,160 B2 * | 11/2008 | Yamamoto | F16D 7/06 | 192/84.941 |
| 7,798,928 B2 * | 9/2010 | Serkh | F02B 67/06 | 474/70 |
| 7,850,557 B2 * | 12/2010 | Moriya | F16H 55/36 | 474/902 |
| 7,850,558 B2 * | 12/2010 | Oh | F16H 35/10 | 474/166 |
| 7,954,735 B2 * | 6/2011 | Belotserkovsky | B02C 25/00 | 241/207 |
| 7,998,008 B2 * | 8/2011 | Kamdem | F16D 47/02 | 474/902 |
| 8,262,520 B2 * | 9/2012 | Shimamura | F16D 3/12 | 474/94 |
| 8,800,904 B2 * | 8/2014 | Belotserkovskiy | B02C 2/042 | 241/207 |
| 9,382,994 B2 * | 7/2016 | Oh | B22D 17/00 | |
| 2001/0016529 A1 * | 8/2001 | Kawachi | F16H 55/36 | 474/94 |
| 2002/0049106 A1 * | 4/2002 | Kimura | F16H 55/36 | 474/152 |
| 2002/0052242 A1 * | 5/2002 | Tabuchi | F16F 1/377 | 464/87 |
| 2002/0146326 A1 * | 10/2002 | Kawaguchi | F16F 15/145 | 417/269 |
| 2003/0153419 A1 * | 8/2003 | Hodjat | F16H 7/1254 | 474/94 |
| 2004/0082390 A1 * | 4/2004 | Nosaka | F16D 9/06 | 464/32 |
| 2006/0084541 A1 * | 4/2006 | Nosaka | F16D 3/68 | 474/170 |
| 2006/0245936 A1 * | 11/2006 | Shibata | C08J 5/128 | 417/223 |
| 2006/0264282 A1 * | 11/2006 | Moriya | F16H 55/36 | 474/94 |
| 2006/0270498 A1 * | 11/2006 | Kanou | F16H 55/36 | 474/70 |
| 2008/0076612 A1 * | 3/2008 | Oh | F16H 35/10 | 474/190 |
| 2008/0305905 A1 * | 12/2008 | Ishikawa | F16H 55/36 | 474/170 |
| 2008/0314709 A1 * | 12/2008 | Ishikawa | F16H 55/36 | 192/55.1 |
| 2009/0005201 A1 * | 1/2009 | Shimamura | F16D 3/12 | 474/94 |
| 2011/0155834 A1 * | 6/2011 | Fan | B02C 2/04 | 241/207 |
| 2014/0113732 A1 * | 4/2014 | Ichinose | F16D 7/048 | 464/38 |
| 2015/0184736 A1 * | 7/2015 | Cha | F16H 55/36 | 474/166 |

* cited by examiner

TORQUE REACTION PULLEY FOR AN INERTIA CONE CRUSHER

RELATED APPLICATION DATA

This application is a divisional of U.S. patent application Ser. No. 16/062,699 filed Jun. 15, 2018, which is a § 371 National Stage Application of PCT International Application No. PCT/EP2015/080433 filed Dec. 18, 2015.

TECHNICAL FIELD

The present disclosure relates to a torque reaction pulley positionable within the drive transmission of an inertia cone crusher and in particular, although not exclusively, to a torque reaction pulley configured to dissipate changes in torque created by the rotation of an unbalanced mass body within the crusher.

BACKGROUND

Inertia cone crushers are used for the crushing of material, such as stone, ore etc., into smaller sizes. The material is crushed within a crushing chamber defined between an outer crushing shell (commonly referred to as the concave), which is mounted at a frame, and an inner crushing shell (commonly referred to as the mantle), which is mounted on a crushing head. The crushing head is typically mounted on a main shaft that mounts an unbalance weight via a linear bushing at an opposite axial end. The unbalance weight (referred to herein as an unbalanced mass body) is supported on a cylindrical sleeve that is fitted over the lower axial end of the main shaft via an intermediate bushing that allows rotation of the unbalance weight about the shaft. The cylindrical sleeve is connected, via a drive transmission, to a pulley which in turn is driveably connected to a motor operative for rotating the pulley and accordingly the cylindrical sleeve. Such rotation causes the unbalance weight to rotate about the a central axis of the main shaft, causing the main shaft, the crushing head and the inner crushing shell to gyrate and to crush material fed to the crushing chamber. Example inertia cone crushers are described in EP 1839753; U.S. Pat. Nos. 7,954,735; 8,800,904; EP 2535111; EP 2535112; US 2011/0155834.

However, conventional inertia crushers, whilst potentially providing performance advantages over eccentric gyratory crushers, are susceptible to accelerated wear and unexpected failure due to the high dynamic performance and complicated force transmission mechanisms resulting from the unbalanced weight rotating around the central axis of the crusher. In particular, the drive mechanism that creates the gyroscopic precision of the unbalanced weight is exposed to exaggerated dynamic forces and accordingly component parts are susceptible to wear and fatigue. Current inertia cone crushers therefore may be regarded as high maintenance apparatuses, which is a particular disadvantage where such crushers are positioned within extended material processing lines.

SUMMARY

An objective of the present solution is to provide a drive transmission coupling mountable at an inertia crusher to form part of a drive transmission mechanism for rotational drive of an unbalanced weight being configured to dissipate relatively large dynamic torque induced by the unbalanced weight gyrating within the crusher and to prevent the transmission of such torque to the crusher and in particular those components of the drive transmission.

It is a further objective to provide an inertia crusher drive transmission coupling configured to deflect and/or dissipate mechanical loading torque associated with the oscillating movement of the unbalanced weight that would otherwise lead to accelerated wear, damage and failure of component parts of the drive transmission and/or the crusher generally.

The objectives are achieved by a drive transmission coupling in the form of a pulley compatible with a drive transmission arrangement or mechanism of an inertia cone crusher that, in part, isolates the rotating unbalanced weight and in particular the associated dynamic forces (principally torque) created during operation of the crusher from at least some components or parts of components of the upstream drive transmission being responsible to induce the rotation of the unbalanced mass body. In particular, the present drive pulley includes a torque reaction elastic component configured to receive changes in the torque at the drive transmission (referred to herein as a 'reaction torque') created by the unbalanced weight as it is rotated about a gyration axis and to supress, dampen, dissipate or diffuse the reaction torque and inhibit or prevent direct transmission into at least regions of the drive transmission components.

The reaction torque pulley is advantageous to support the mass body in a 'floating' arrangement within the crusher and to allow and accommodate non-circular orbiting motion of the crusher head (and hence main shaft) about the gyration axis causing in turn the unbalanced weight to deviate from its ideal circular rotational path. Accordingly the drive transmission components are partitioned from the torque resultant from undesired changes in the angular velocity of the unbalanced weight and/or changes in the radial separation of the main shaft and the centre of mass of the unbalanced weight from the gyration axis. Accordingly, the drive transmission, incorporating the present torque reaction component, is isolated from exaggerated and undesirable torque resulting from the non-ideal, dynamic and uncontrolled movement of the oscillating mass body. The torque reaction coupling is configured to receive, store and dissipate energy received from the motion of the rotating mass body and to, in part, return at least some of this torque to the mass body as the reactive coupling displaces and/or deforms elastically in position within the drive transmission pathway. Such an arrangement is advantageous to reduce and to counter the large exaggerated torque so as to facilitate maintenance of a desired circular rotational path and angular velocity of the unbalanced mass about the gyration axis.

The present torque reaction pulley provides a flexible or non-rigid connection to the unbalanced weight to allow at least partial independent movement (or movement freedom) of the unbalanced weight relative to at least parts of the drive transmission such that the drive transmission has movement freedom to accommodate dynamic torsional change. In particular, the centre of mass of unbalanced weight is free to deviate from a predetermined (or ideal) circular gyroscopic precession and angular velocity without compromising the integrity of the drive transmission and other components within the crusher. The present pulley is advantageous to prevent damage and premature failure of the crusher component parts and in particular those parts associated with the drive transmission.

According to a first aspect there is provided a torque reaction pulley mountable at an inertia crusher to form part of a drive transmission mechanism for rotational drive of an unbalanced mass body within the crusher comprising a drive input portion connectable to a motor to provide rotational drive to the pulley; a drive output portion connectable to the mass body to transmit the rotational drive to the mass body; an elastic component formed non-integrally with the input and output portions and having a first part anchored in coupled connection with the drive input portion and a second part anchored in coupled connection with the drive output portion so as to be positioned in the drive transmission pathway intermediate the drive input and output portions; the elastic component configured to transmit a torque to the mass body and to dynamically displace and/or deform elastically in response to a change in the torque resultant from rotation of the mass body within the crusher so as to dissipate the change in the torque at the crusher.

The torque reaction pulley is configured to deflect and/or dissipate exclusively mechanical loading torque associated with the oscillating movement of the unbalanced weight (due to deviation of the main shaft form the ideal circular path) within the drive transmission, the drive input component or the mass body. That is, the torque reaction pulley is positioned and/or configured to respond exclusively to torsional change and to be unaffected by other transverse loading including in particular tensile, compressive, shear and frictional forces within the drive transmission.

Reference within the specification to 'a torque reaction pulley' encompasses a wheel drive transmission positioned as a drive input component downstream (in the drive transmission pathway) of a drive belt (such as V-belts), a motor drive shaft, a motor or other power source unit, component or arrangement positioned upstream from the crusher.

Reference within this specification to the elastic component being configured to 'displace and/or deform elastically' encompasses the elastic component configured to move relative to other components within the drive transmission and/or the other components or regions of the torque reaction pulley and to displace relative to a 'normal' operation position of the elastic component when transmitting driving torque to the mass body at a predetermined torque magnitude without influence or change in the torque resultant from changes in rotational motion of the crusher head about the gyration axis (e.g., a change in the tilt angle of the crusher head) and/or a rotational speed of the crusher head. This term encompasses the elastic component comprising a stiffness sufficient to transmit a drive torque to at least part of the mass body whilst being sufficiently responsive by movement/deformation in response to change in the torque at the drive transmission, the mass body or drive input component. The term 'dynamically displace' encompasses rotational movement and translational shifting of the torque reaction coupling in response to the deviation of the main shaft from the circular orbiting path.

The torque reaction coupling is mechanically attached, anchored or otherwise linked to the drive transmission, and in particular other components associated with the rotation drive imparted to the crusher head, and comprises at least a part or region that is configured to rotate or twist about an axis so as to absorb the changes in torque. At least respective first and second attachment ends or regions of the torque reaction coupling are mechanically fixed or coupled to components within the drive transmission such that at least a further part or region of the torque reaction coupling (positionally intermediate the first and second attachment ends or regions) is configured to rotate or twist relative to (and independently of) the static first and second attachment ends or regions.

The term 'change in rotational motion of the crusher head' encompasses deviation of the crusher head, from a desired circular orbiting path about the gyration axis. Where the crusher head is inclined at a tilt angle, the change in rotational motion of the crusher head may comprise a change in the tilt angle. Optionally, the crusher head may be aligned parallel with a longitudinal axis of the crusher such that the deviation from the circular orbiting path is a translational displacement. The reference herein to a 'change in the rotational speed of the crusher head' encompasses sudden changes in angular velocity of the head and accordingly the mass body that in turn results in inertia changes within the system that are transmitted through the drive transmission and manifest as torque.

Optionally, the torque reaction pulley is positioned immediately below the crusher and represents an end drive transmission component of the crusher positioned downstream of a drive input arrangement such as a belt drive. Optionally, the torque reaction coupling is aligned so as to be positioned on the longitudinal axis extending through the crusher head and/or main shaft when the crusher is non-operative or immobile. The torque reaction coupling can be positioned on the central longitudinal axis of the crusher such that the axis of the pulley is coaxial with the crusher longitudinal axis.

The elastic component can be attached to the drive input and output portions of the torque reaction pulley via releasable attachments such that the elastic component may be mounted and decoupled from the drive input and output portions and hence the crusher. The releasable attachments may be bolts, screws, pins, clips, cooperating threads, push-fit or snap-fit connections to allow releasable mounting of the elastic component at the pulley.

The elastic component can be mounted at one end of the pulley. For example, the elastic component is mounted at a lower end of the pulley when the pulley is secured in position at the crusher. The releasable attachments that connect the elastic component to the pulley are accessible from below the pulley to facilitate mounting and demounting of the elastic component during servicing, maintenance or to change the torque reaction characteristic of the pulley. In particular, at least parts of the attachments are positioned externally at the pulley.

Optionally, the drive transmission within which the present torque reaction pulley is positioned includes at least one further drive transmission component coupled between the mass body and the drive input component to form part of the drive transmission. Optionally, the further drive transmission component may include a torsion rod, drive shaft, bearing assembly, bearing race, torsion bar mounting socket or bushing connecting the unbalanced weight to a power unit such as a motor.

Optionally, the torque reaction pulley includes a modular assembly construction formed from a plurality of component parts in which a selection of the component parts are configured to move relative to one another.

Optionally, the elastic component is connected indirectly to the output portion via at least one drive component forming a part of the pulley and configured to transmit the torque.

Optionally, the elastic component is connected indirectly to the input portion via at least one drive component forming a part of the pulley and configured to transmit the torque. The drive component may include bearings, bearing housings, adaptor shafts, flanges, bearing races or other annular bodies or linkages that form a modular component part of the pulley coupling adjacent components.

The drive input portion includes an annular belt support component arranged to mount and positionally support a belt drive to extend at least partially around the belt support component. The belt support includes a plurality of grooves extending circumferentially around the support and recessed into an external facing surface of the support with each groove configured to at least partially accommodate a V-belt drive component. The grooves may include a V-shaped cross-sectional profile and extend 360° around the belt support.

The drive output portion has a race having an axially extending socket or recess capable of mounting one end of a torsion bar or drive shaft demountably connectable to the pulley. The race may include a plurality of bores extending internally through at least part of the body of the race to receive attachment bolts to releasably mount the elastic component to the race.

Optionally, the pulley includes a first adaptor flange coupled between and connecting the input portion and the elastic component. Optionally, the pulley further includes a second adaptor flange coupled between and connecting the output portion and the elastic component. The first and second adaptor flanges are resiliently deformable. The adaptor flanges may be annular and include respective elastomeric rings.

The elastic component may include at least one elastomeric component configured to twist in response to the transmission of the torque through the pulley. With such a configuration the elastic component is configured to deform in response to a change in torque through the pulley and to return elastically to the shape, configuration and position of the component prior to the change in torque.

Optionally, the elastic component includes at least one disc having spokes configured to deform via twisting about a rotational axis of the pulley in response to transmission of the torque through the pulley. The elastic component includes a plurality of discs stacked on top of one another via interconnecting members such that the spokes are arranged in series in the drive transmission pathway intermediate to the drive input and output portions.

Optionally, at least some of the discs of the stack may be connected axially to adjacent discs via connections positioned towards the radial perimeter of the discs and at least some of the discs of the stack may be connected axially to adjacent discs via mountings positioned at radially inner regions of the discs. Optionally, the stack of discs may include a first attachment plate secured to an upper disc at an upper end of the stack and a corresponding second attachment plate secured to a lower disc at a lower end of the stack. Optionally, the discs may be secured to one another via bolts, pins or lugs at either the radially outer or inner portions.

Optionally, the elastic component includes a spring. Optionally, the spring is a helical or coil spring. Optionally, the spring includes any one or a combination of the following: a torsion spring, a coil spring, a helical spring, a gas spring, a torsion disc spring, or a compression spring. Optionally, the spring includes any cross-sectional shape profile including for example rectangular, square, circular, oval etc. Optionally, the spring may be formed from an elongate metal strip coiled into a circular spiral.

Optionally, the elastic component includes a torsion bar, pad or body configured to twist about a central axis in response to differences in torque at each respective end of the elastic component.

Optionally, the torque reaction pulley includes a plurality of elastic components such as springs of different types or configurations and/or elastomers mounted at the pulley in series and/or in parallel.

Optionally, the spring includes a stiffness in range 100 Nm/degrees to 1500 Nm/degrees. Optionally, the spring includes a damping coefficient (in Nm·s/degree) of less than 10%, 5%, 3%, 1%, 0.5% or 0.1% of the stiffness depending on the power of the crusher motor and the mass of the unbalanced weight. Such an arrangement enables the spring to transmit a drive torque whilst being sufficiently flexible to deform in response to the reaction torque.

In particular, the elastic component(s) may be configured to twist between respective connection ends by an angle in the range +/−45°. Accordingly, the elastic reaction coupling is configured to twist internally (with reference to its connection ends) by an angle up to 90° in both directions. Such a range of twist excludes an initial deflection due to torque loading when the crusher is operational and the flexible coupling is acted upon by the drive torque. Such initial preloading may involve the coupling deflecting by 10 to 50°, 10 to 40°, 10 to 30°, 10 to 25°, 15 to 20° or 20 to 30°. The elastic coupling is capable of deflecting further beyond the initial torsional preloading so as to be capable of 'winding' or 'unwinding' from the initial (e.g., 15 to 20°) deflection. Optionally, the torsion responsive coupling includes a maximum deflection, that may be expressed as a twist of up to 70°, 80°, 90°, 100°, 110°, 120°, 130° or 140° in both directions. Optionally, the coupling may be configured to deflect by 5 to 50%, 5 to 40%, 5 to 30%, 5 to 20%, 5 to 10%, 10 to 40%, 20 to 40%, 30 to 40%, 20 to 40%, 20 to 30%, 10 to 50%, 10 to 30% or 10 to 20% of the maximum deflection in response to the 'normal' loading torque transmitted through the coupling when the crusher is active optionally pre or during crushing operation.

The deviations from the circular orbiting path of the mass body may accordingly result from deviations by the crusher head from the desired circular rotational path that, in turn, may result from changes in the type, flow rate or volume of material within the crushing zone (between the crushing shells) and/or the shape and in particular imperfections or wear of mantle and concave.

According to a second aspect there is provided an inertia cone crusher comprising a pulley as claimed herein.

According to a third aspect there is provided an inertia crusher having a frame to support an outer crushing shell, a crusher head moveably mounted relative to the frame to support an inner crushing shell to define a crushing zone between the outer and inner crushing shells, a drive transmission mechanism as described herein and a torque reaction pulley as described and claimed herein.

The present torque reaction pulley is dynamically responsive to changes in the rotational path and/or the angular velocity of the mass body and in particular a change in the rotational motion of the crusher head about the gyration axis and/or a rotational speed of the crusher head. This in turn causes the change in torque within the drive transmission. The present torque reaction pulley therefore provides a flexible linkage to accommodate undesired and unpredicted torsion created by rotation of the mass body.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
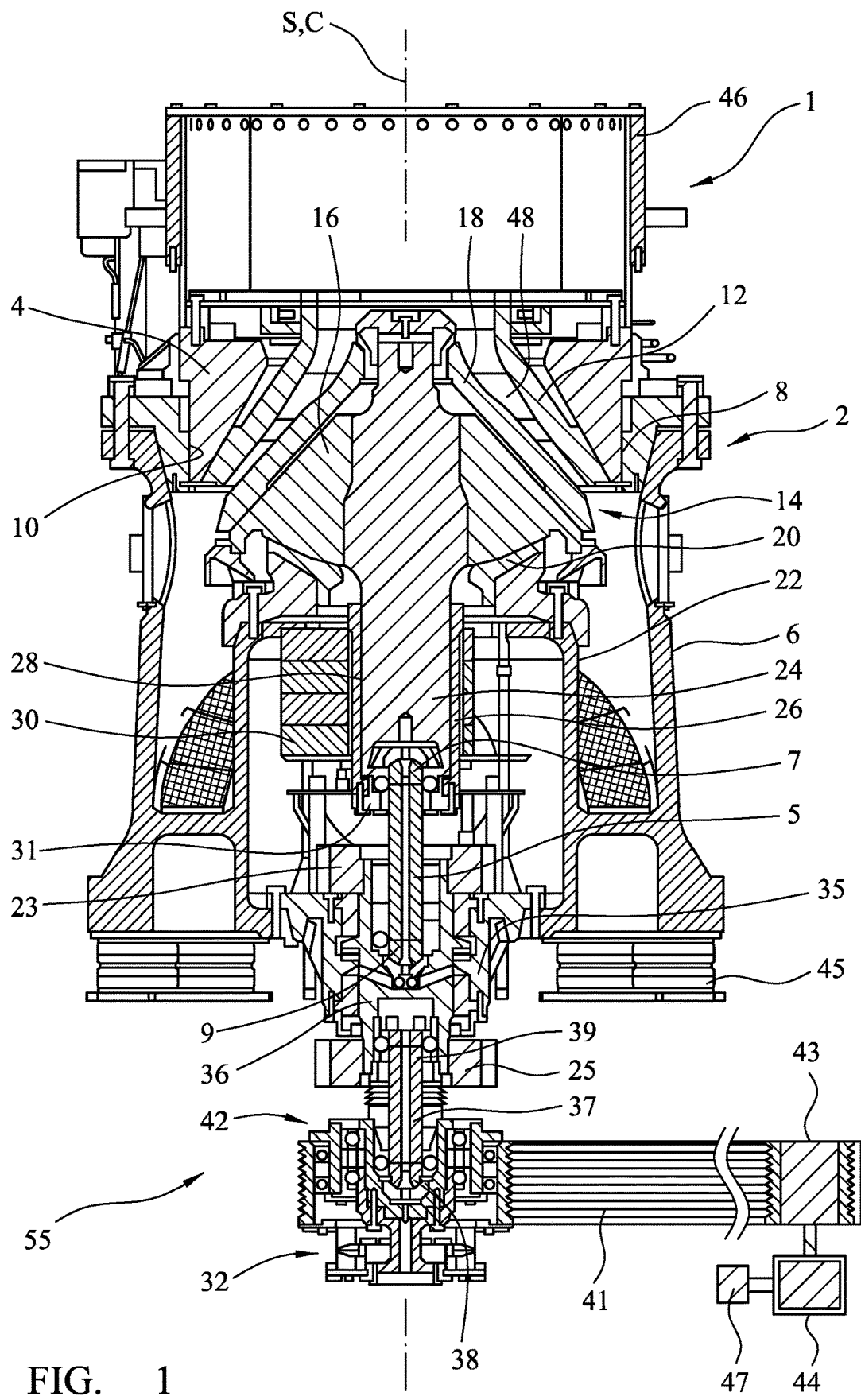
FIG. 1 is a cross-sectional view through an inertia cone crusher according to. present disclosure.

FIG. 1 illustrates an inertia cone crusher 1 in accordance with one embodiment of the present disclosure. The inertia crusher 1 includes a crusher frame 2 in which the various parts of the crusher 1 are mounted. Frame 2 includes an upper frame portion 4 and a lower frame portion 6. Upper frame portion 4 may have the shape of a bowl and is provided with an outer thread 8, which cooperates with an inner thread 10 of lower frame portion 6. Upper frame portion 4 supports, on the inside thereof, a concave 12 which is a wear part and is typically cast from a manganese steel.

Lower frame portion 6 supports an inner crushing shell arrangement represented generally by reference 14. Inner shell arrangement 14 includes a crushing head 16, having a generally coned shape profile and which supports a mantle 18 that is similarly a wear part and typically cast from a manganese steel. Crushing head 16 is supported on a part-spherical bearing 20, which is supported in turn on an inner cylindrical portion 22 of lower frame portion 6. The outer and inner crushing shells 12, 18 form between them a crushing chamber 48, to which material that is to be crushed is supplied from a hopper 46. The discharge opening of the crushing chamber 48, and thereby the crushing performance can be adjusted by means of turning the upper frame portion 4, by means of the threads 8,10, such that the vertical distance between the shells 12, 18 is adjusted. Crusher 1 is suspended on cushions 45 to dampen vibrations occurring during the crushing action.

The crushing head 16 is mounted at or towards an upper end of a main shaft 24. An opposite lower end of shaft 24 is encircled by a bushing 26, which has the form of a cylindrical sleeve. Bushing 26 is provided with an inner cylindrical bearing 28 making it possible for the bushing 26 to rotate relative to the crushing head shaft 24 about an axis S extending through head 16 and shaft 24.

An unbalance weight 30 is mounted eccentrically at (one side of) bushing 26. At its lower end, bushing 26 is connected to the upper end of a drive transmission mechanism indicated generally by reference 55. Drive transmission 55 includes a first upper torsion bar 5 having a first upper end 7 and a second lower end 9. The first end 7 is connected to a lowermost end of bushing 26 via a race 31 whilst second end 9 is mounted in coupled arrangement with a drive shaft 36 rotatably mounted at frame 6 via a bearing housing 35.

A second lower torsion bar 37 is driveably coupled to a lower end of drive shaft 36 via its first upper end 39. A corresponding second lower end 38 of second torsion bar 37 is mounted at a drive pulley indicated generally by reference 42. An upper balanced weight 23 is mounted to an axial upper region of drive shaft 36 and a lower balanced weight 25 is similarly mounted at an axial lower region to drive shaft 36. According to the specific implementation, drive shaft 36, bearing housing 35, first and second torsion bars 5, 37 and pulley 42 are aligned coaxially with one another, main shaft 24 and crushing head 16 so as to be centred on axis S.

Drive pulley 42 mounts a plurality of drive V-belts 41 extending around a corresponding motor pulley 43. Pulley 42 is driven by a suitable electric motor 44 controlled via a control unit 47 that is configured to control the operation of the crusher 1 and is connected to the motor 44, for controlling the RPM of the motor 44 (and hence its power). A frequency converter, for driving the motor 44, may be connected between the electric power supply line and the motor 44. Pulley 42 includes a torque reaction coupling indicated generally by reference 32 having at least one component being configured to deform and/or displace elastically in response to changes torque changes as described in detail below.

According to a specific implementation, drive mechanism 55 includes four CV joints at the regions of the respective mounting ends 7 and 9 of the first torsion bar 5 and the respective ends 39, 38 of the second torsion bar 37. Accordingly, the rotational drive of the pulley 42 by motor 44 is translated to bushing 26 and ultimately unbalanced weight 30 via intermediate drive transmission components 5, 36 and 37. Accordingly, pulley 42 may be regarded as a drive input component of crusher 1. Pulley 42 is centered on a generally vertically extending central axis C of crusher 1 that is aligned coaxially with shaft and head axis S when the crusher 1 is stationary.

Figure 2:
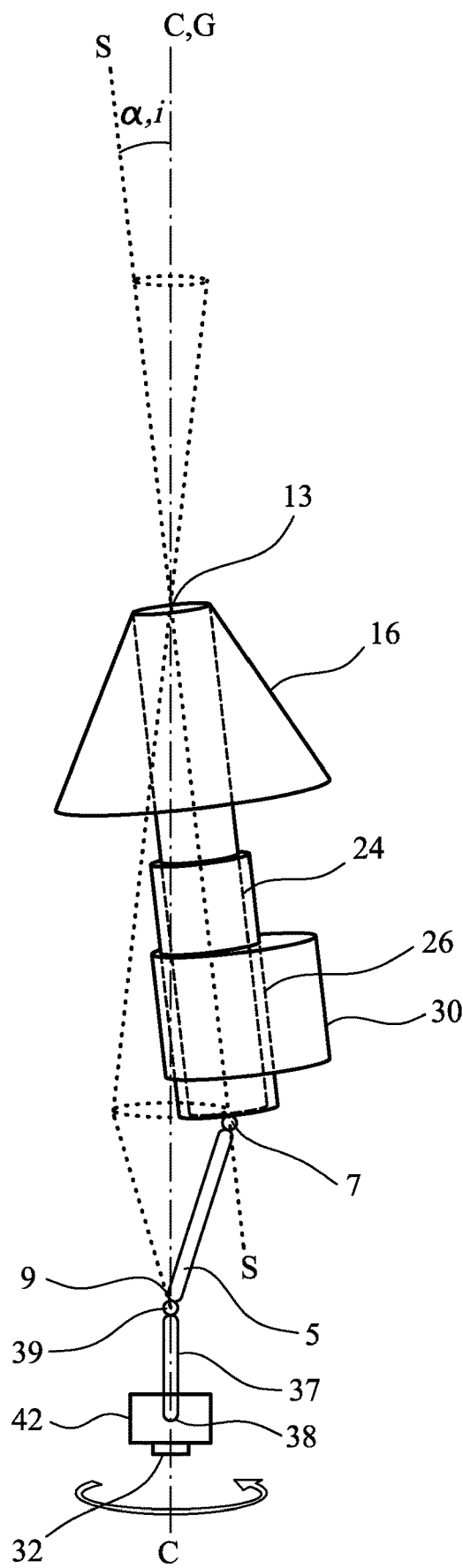
FIG. 2 is a schematic side view of selected moving components within the inertia crusher of FIG. 1 including in particular a crushing head, an unbalanced weight and a drive transmission.

When the crusher 1 is operative, the drive transmission components 5, 36, 37 and 42 are rotated by motor 44 to induce rotation of bushing 26. Accordingly, bushing 26 swings radially outward in the direction of the unbalance weight 30, displacing the unbalance weight 30 away from crusher vertical reference axis C in response to the centrifugal force to which the unbalance weight 30 is exposed. Such displacement of the unbalance weight 30 and bushing 26 (to which the unbalance weight 30 is attached), is achieved due to the motional freedom of the CV joints at the various regions of drive transmission 55. Additionally, the desired radial displacement of weight 30 is accommodated as the sleeve-shaped bushing 26 is configured to slide axially on the main shaft 24 via cylindrical bearing 28. The combined rotation and swinging of the unbalance weight 30 results in an inclination of the main shaft 24, and causes head and shaft axis S to gyrate about the vertical reference axis C as illustrated in FIG. 2 such that material within crushing chamber 48 is crushed between outer and inner crushing shells 12, 18. Accordingly, under normal operating conditions, a gyration axis G, about which crushing head 16 and shaft 24 will gyrate, coincides with the vertical reference axis C.

FIG. 2 illustrates the gyrating motion of the central axis S of the shaft 24 and head 16 about the gyration axis G during normal operation of the crusher 1. For reasons of clarity, only the rotating parts are illustrated schematically. As the drive shaft 36 and torsion rods 5 and 37 are rotated by the induced rotation of drive input pulley 42, the unbalance weight 30 swings radially outward thereby tilting the central axis S of the crushing head 16 and the shaft 24 relative to the vertical reference axis C by an inclination angle i. As the tilted central axis S is rotated by the drive shaft 36, it will follow a gyrating motion about the gyration axis G, the central axis S thereby acting as a generatrix generating two cones meeting at an apex 13. A tilt angle α, formed at the apex 13 by the central axis S of head 16 and the gyration axis G, will vary depending on the mass of the unbalance weight 30, the RPM at which the unbalance weight 30 is rotated, the type and amount of material that is to be crushed, the DO setting and the shape profile of the mantle and concave 18, 12. For example, the faster the drive shaft 36 rotates, the more the unbalance weight 30 will tilt the central axis S of the head 16 and the shaft 24.

Under the normal operating conditions illustrated in FIG. 2, the instantaneous inclination angle i of the head 16 relative to the vertical axis C coincides with the apex tilt angle α of the gyrating motion. In particular, when the drive transmission components 5, 36, 37 and 42 are rotated the unbalanced weight 30 is rotated such that the crushing head 16 gyrates against the material to be crushed within the crushing chamber 48. As the crushing head 16 rolls against the material at a distance from the periphery of the outer crushing shell 12, central axis S of crushing head 16, about which axis the crushing head 16 rotates, will follow a circular path about the gyration axis G. Under normal operating conditions the gyration axis G coincides with the vertical reference axis C. During a complete revolution, the central axis S of the crushing head 16 passes from 0-360°, at a uniform speed, and at a static distance from the vertical reference axis C.

However, the desired circular gyroscopic precession of head 16 about axis C is regularly disrupted due to many factors including for example the type, volume and non-uniform delivery speed of material within the crushing chamber 48. Additionally, asymmetric shape variation of the crushing shells 12, 18 acts to deflect axis S (and hence the head 16 and unbalanced weight 30) from the intended inclined tilt angle i. Sudden changes from the intended rotational path of the main shaft relative to axis G and speed of the unbalanced weight 30 manifest as substantial exaggerated dynamic torsional changes that are transmitted into the drive transmission components 5, 36, 37 and 42. Such dynamic torque can result in accelerated wear, fatigue and failure of the drive transmission 55 and indeed other components of the crusher 1.

Torque reaction coupling 32, includes at least one elastic component configured to deform elastically in response to receipt of the dynamic torque resultant from the undesired and uncontrolled movement and speed of unbalanced weight 30. In particular, coupling 32 is arranged to be self-adjusting via twisting, radial and/or axial expansion and contraction as torque is transmitted through the transmission 55. Accordingly, the reaction torque resultant from the exaggerated motion of unbalanced weight 30 is dissipated by coupling 32 and is inhibited and indeed prevented from propagation within the drive transmission 55. Torque reaction coupling 32 is configured to receive, store and at least partially return torque to components of the drive transmission 55 such as in particular bushing 26 and unbalanced weight 30. Accordingly, unbalanced weight 30 via coupling 32 is suspended in a 'floating' arrangement relative to parts of the drive transmission 55. That is, coupling 32 enables a predetermined amount of change in the tilt angle i of weight 30 in addition to changes in the angular velocity of weight 30 relative to the corresponding rotational drive of components 36, 37 and 42.

Figure 3:
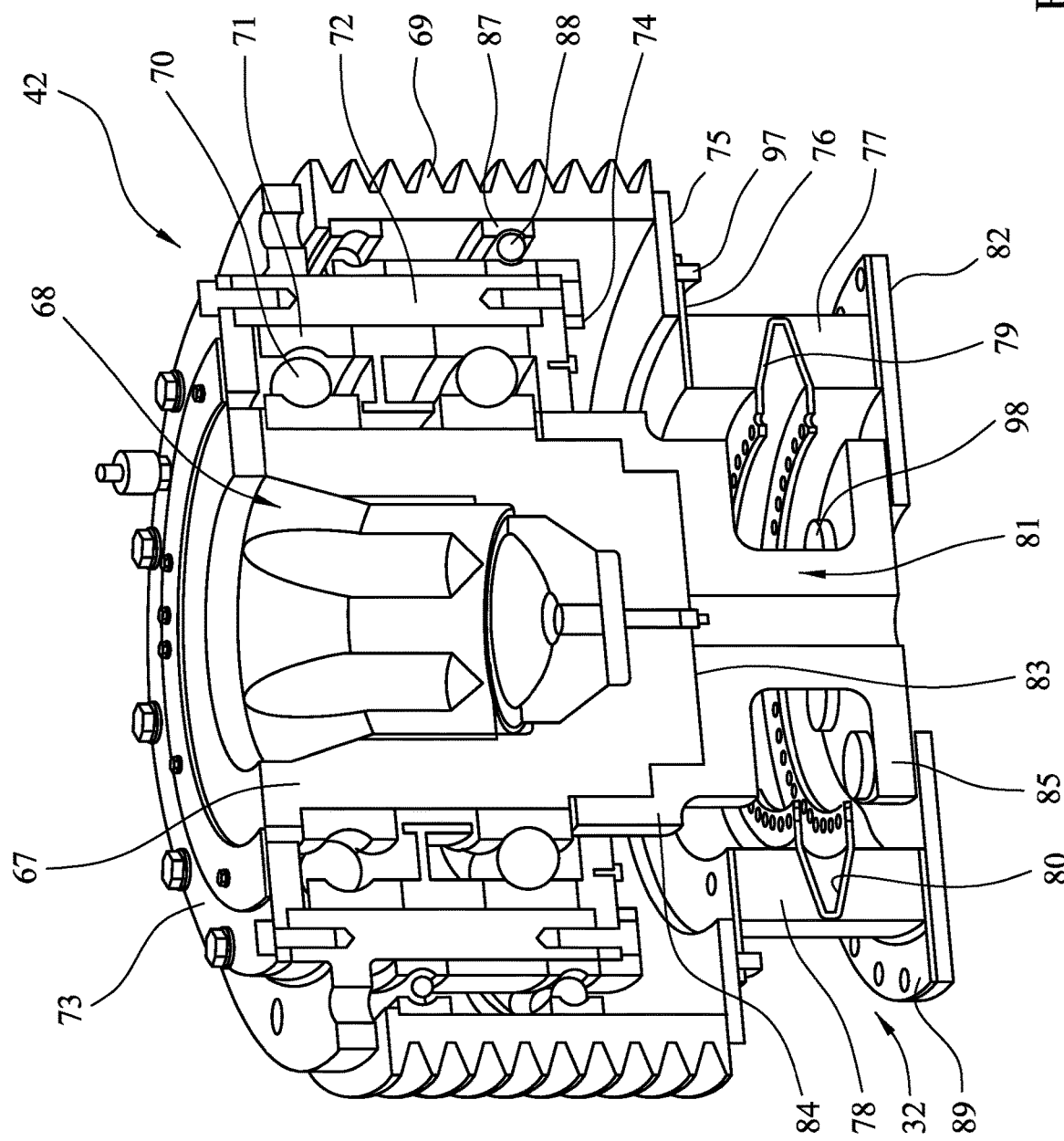
FIG. 3 is a cross-sectional perspective view of a torque reaction pulley being a drive input component of the crusher of FIG. 1.
Figure 4:
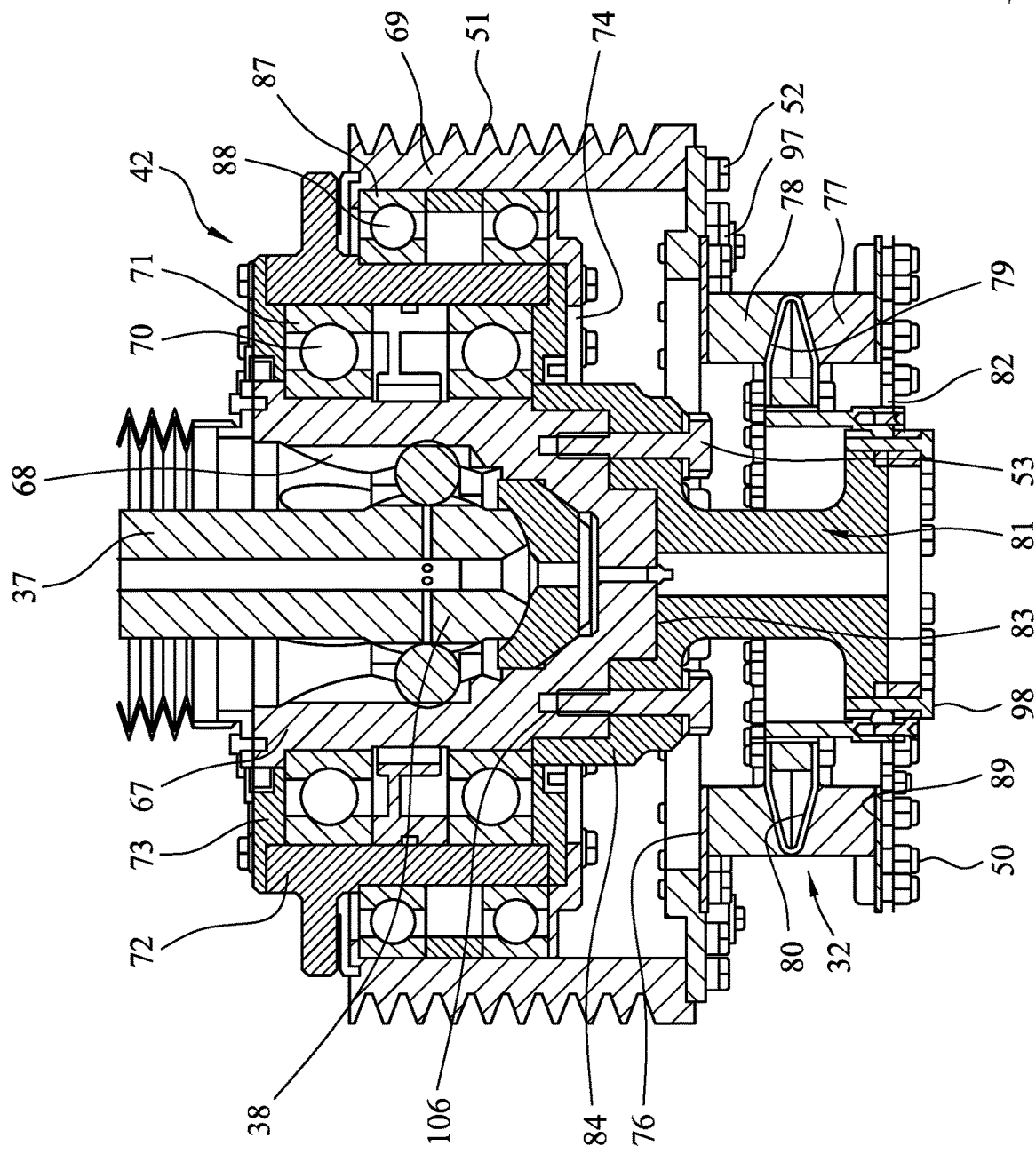
FIG. 4 is a further cross-sectional view of the pulley of FIG. 3.

Referring to FIGS. 3 and 4, the drive pulley 42 includes a radially outermost race 69 having a series of grooves 51 to partially accommodate the V-belts 41 (FIG. 1) configured to drive rotation of race 69. A radially inner race 67 defines a socket 68 to receive the lower end 38 of lower torsion bar 37. An inner bearing assembly, comprising bearings 70 and bearing raceways 71, is mounted radially outside inner race 67 and secured in position via an upper mounting disc 73 and a lower mounting disc 74. An adaptor shaft indicated generally by reference 81 includes a radially outward extending axially upper cup portion 84 non-moveably attached to a lower region 83 of inner race 67. Adaptor shaft 81 also includes a radially outward extending flange 85 provided at a lowermost end of shaft 81. An outer bearing assembly, comprising bearings 88 and bearing raceways 87, is positioned radially between the grooved radially outer race 69 and a bearing housing 72 that is positioned radially between the two bearings assemblies 87, 88 and 70, 71. Accordingly, the outer grooved race 69 is capable of independent rotation relative to the inner race 67 via the respective bearing assemblies 70, 71 and 87, 88.

The flexible torsion coupling 32 is positioned in the drive transmission pathway between the grooved pulley race 69 and the inner race 67 via adaptor shaft 81. According to the specific implementation, coupling 32 includes a modular assembly formed from deformable elastomeric rings and a set of intermediate metal disc springs. In particular, a first annular upper elastomer ring 78 mounts at its lowermost annular face a first half of a disc spring 79. A corresponding second lower annular elastomer ring 77 similarly mounts at its upper annular face a second half of the disc spring 80 to form an axially stacked assembly in which the metal disc spring 79, 80 separates respective upper and lower elastomeric rings 78, 77. Rings 78, 77 are formed from a relatively soft elastomeric material that is deformed and in particular twisted internally (by around 15 to 20°) during an initial preloading of the crusher when motor is operational and torque is transmitted through the coupling 32. A first upper annular metal flange 76 is mounted at an upper annular face of the upper elastomer ring 78 and a corresponding second lower metal flange 89 is attached to a corresponding axially lower face of the lower elastomer ring 77. Upper flange 76 is attached at its radially outer perimeter to a first upper adaptor flange 75 formed as a thin plate of a steel material. Flange 75 is secured at its radially outer perimeter to a lower annular face of the grooved belt race 69. Accordingly, adaptor flange 75 and coupling flange 76 provide one half of a mechanical coupling between the grooved V belt race 69 and the flexible coupling 32.

Similarly, a second lower adaptor flange 82, (also formed from as a thin plate of a steel material) is mounted to the lower coupling flange 89 at a radially outer region and is mounted to adaptor shaft flange 85 at a radially inner region. Accordingly, adaptor flange 82 provides a second half of the mechanical connection between flexible coupling 32 and inner race 67 (via adaptor shaft 81). Each of the elastomeric components 78 and 77 are configured to elastically deform in response to torsional loading in a first rotational direction due to the drive torque and in the opposed rotational direction by the reaction torque. Adaptor flanges 75 and 82 are specifically configured physically and mechanically to be stiffer in torsion relative to components 77, 78, but to be deformable axially so as to provide axial freedom and to allow components 78, 77 to flex in response to the torque loading.

Flexible coupling 32 is demountably interchangeable at pulley 42 via a set of releasable connections. In particular, upper coupling flange 76 is releasably mounted to adaptor flange 75 via attachments bolts 97 and lower coupling flange 89 is releasably attached to adaptor flange 82 via corresponding attachment bolts 50. Similarly, adaptor flange 75 is releasably mounted to outer race 69 via a set of attachment bolts 52. Additionally, lower adaptor flange 82 is releasably attached to the adaptor shaft flange 85 via releasable attachment bolts 98.

Adaptor shaft 81 is interchangeably mounted at race lower region 83 via a set of attachment threaded bolts 53 received with threaded bores 106 extending axially into race 67 from lower region 83. Accordingly, coupling 32 is interchangeable (mountable and demountable) at pulley 42 via some or all of the releasable attachment components 52, 97, 50, 98 and 53. Such a configuration is advantageous to selectively adjust the torque reaction characteristic of pulley 42 as desired to suit for example different types of material to be processed, different material feed flow rates, the status and integrity of the inner and outer crushing shells 18, 12 and the speed or power drawer of the motor that drives the drive transmission 55. Additionally, the material of elastomeric rings 77, 78 and flanges 75 and 82 may be selected to achieve the desired deformation characteristic with regard to the annular range of twist of coupling 32 and the axial displacement provided by flange 82.

In the mounted position at pulley 42, the elastomeric components 78, 77 (in addition to the metal disc spring 79, 80) are configured to deform radially and axially via twisting, axial and radial compression and expansion in response to the driving and reaction torques. Coupling 32, is accordingly configured to dissipate the undesired reaction torque created by the change in the tilt angle $\alpha$ and the non-circular orbiting motion of the unbalanced weight 30. In particular, coupling 32 is configured specifically to absorb and dissipate torque.

Figure 5:
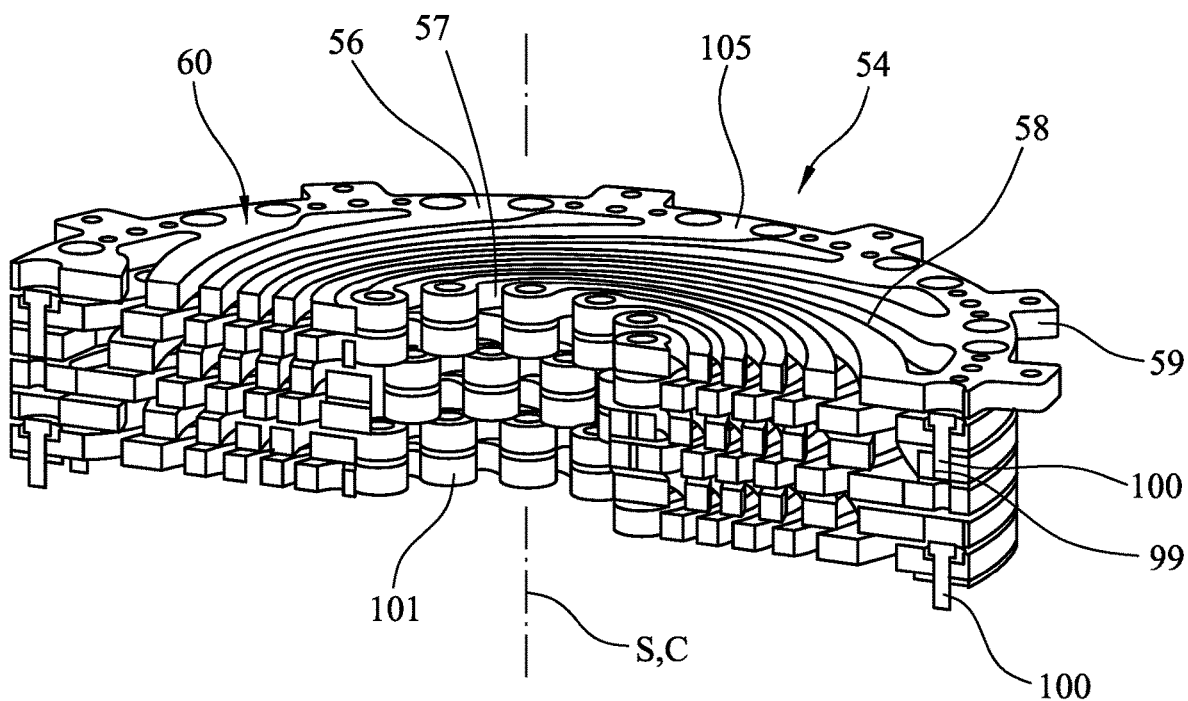
FIG. 5 is a cross-sectional perspective view of a further specific implementation of an elastically deformable component forming a part of a drive input pulley.
Figure 6:
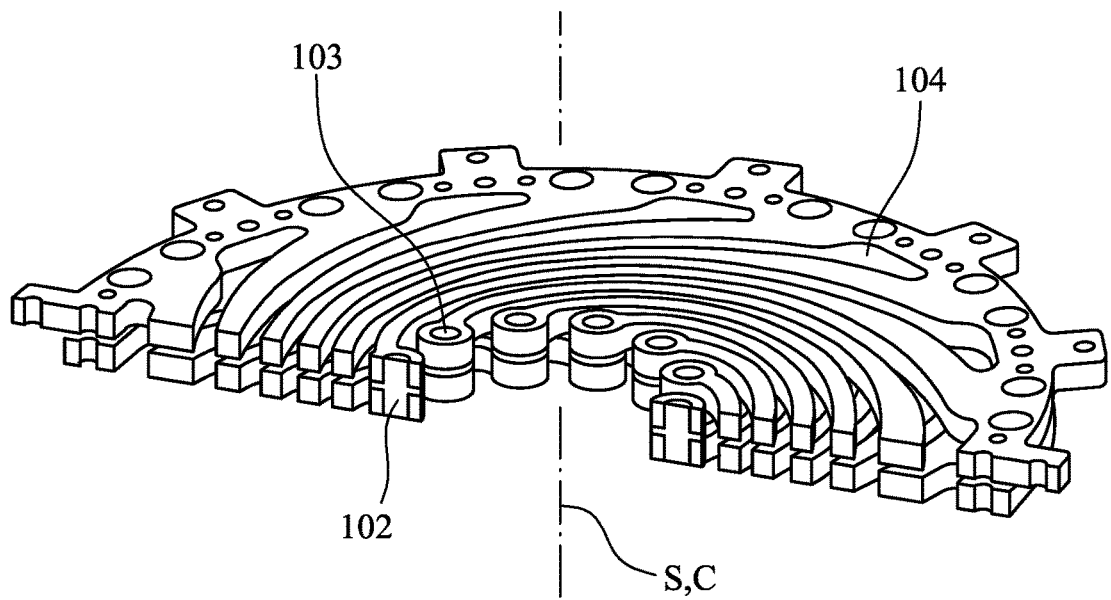
FIG. 6 is a further cross-sectional perspective view of a region of the elastically deformable component of FIG. 5.
Figure 7:
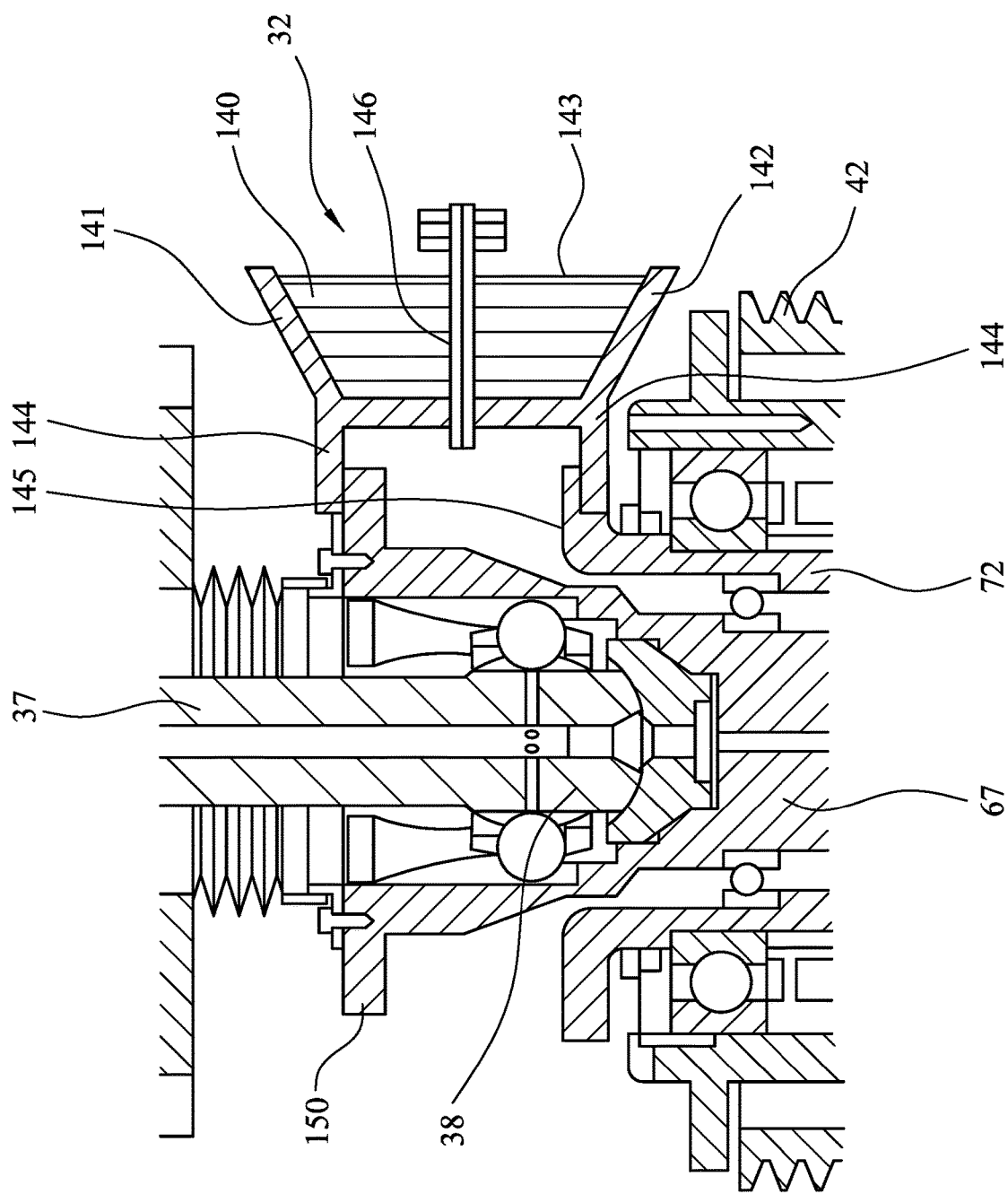
FIG. 7 is a further specific implementation of a torque reaction pulley having an elastically deformable component positioned between selected drive transmission components within the pulley.

FIGS. 5 to 6 illustrate further embodiments of torque reaction coupling 32 forming a component part of pulley 42. According to the further embodiment of FIGS. 5 and 6, the elastic deformation is provided by a plurality of radially extending spokes 58 that are capable of distorting and deflecting in a circumferential direction (by rotation) and hence to respond to the change in torque induced by the motion of unbalanced weight 30. Each spoke is separated circumferentially and radially from neighbouring spokes 58 by gap regions 104 that allow each spoke 58 to flex in the circumferential and radial directions.

In particular, coupling 32 includes a stack 54 of metal discs 60 that each includes a radially outermost perimeter region 56 and a radially innermost region 57. Spokes 58 extend between regions 56 and 57 with each spoke extending along a segment of a spiral having a generally arcuate curved shape profile. Each spoke 58 extends radially inward from a perimeter collar 105 and is terminated at its radially innermost end by a mounting hub 101. A plurality of mounting flanges 59 project radially outward from outer collar 105 of an uppermost disc 60 of the stack 54. It is noted that only a portion of the stack 54 is illustrated and a corresponding lowermost disc (not shown) of the stack includes corresponding flanges 59.

Each of the discs 60 are arranged in pairs in the axial direction with neighbouring discs of a pair each connected outwardly towards perimeter region 56 or innermost region 57. A polarity of bores 99 extend through each collar 105 with an attachment bolt 100 coupling two discs 60 of a pair. The discs 60 of a corresponding adjacent pair of the stack 54 are coupled at respective inner regions 57 via mounting hubs 101. In particular, each hub 101 of adjacent discs 60 are coupled via a mounting pin 102 received within a corresponding bore 103 extending axially through each hub 101. Accordingly, stack 54 includes respective pairs of discs 60 that are connected together in an alternating sequence in the axial direction via their outer regions 56 and inner regions 57. The axial endmost discs 60 are accordingly attached to a mounting flange (not shown) corresponding to respective upper and lower metal coupling flanges 76, 89 with the discs 60 sandwiched axially between the upper and lower flanges (or plates). With the stack 54 mounted in position at pulley 42 and uppermost disc 60 of the stack is attached to outer race 69 and a lowermost disc 60 of the stack is attached to inner race 67. Accordingly, both the drive and the reaction torque are transmitted through discs 60 and in particular spokes 58 that are configured to deflect in the circumferential direction (by rotation) such that outer collar 105 is capable moves radially inward and outward relatively to inner race 67 (and axis C). As will be appreciated, the number, shape and configuration of spokes 58 may be selected accordingly to further embodiments to suit the elastic deformation characteristic of the coupling 32.

According to further embodiments, coupling 32 being positioned in the drive transmission between outer race 69 and inner race 67 and may include a spring, and in particular a torsion spring, a coil spring, a helical spring, a fluid (or liquid) spring, a torsion disc spring or a compression spring.

Also, the deformable coupling 32 may be positioned at different regions of pulley 42 and in particular intermediate in the drive transmission pathway between outer race 69 and inner race 67 including for example, between inner race 67 and bearing housing 72, inner race 67 and adaptor shaft 81, adaptor shaft 81 and outer race 69 or a combination of these different positions.

The torsional responsive pulley 42 is described according to a further embodiment in which deformable coupling 32 is positioned between inner race 67 and bearing housing 72. Similar to the embodiment of FIGS. 3 and 4, coupling 32 includes a modular assembly having first and second elastomeric rings 140, 143 secured between respective upper and lower mounting plates 141, 142. A metal disc spring 146 partitions the upper and lower elastomeric rings 140, 143 and is configured to allow a degree of independent rotational motion of rings 140, 143 resulting from torque induced by the motion of unbalanced weight 30. Lower plate 142 is mounted at its radially inner region 144 to a radially outward extending flange 145 projecting from bearing housing 72 as described with reference to FIGS. 3 and 4.

Similarly, a radially inner region 144 of upper plate 141 is coupled to a radially outward extending flange 150 projecting from an upper region of inner race 67 that supports lower torsion rod 37 as described with reference to FIGS. 3 and 4. Accordingly, drive and reaction torque is transmitted between bearing housing 72 and inner race 67 via flexible coupling 32. Accordingly, the undesirable reaction torque is dissipated dynamically by the rotational twisting of elastomer rings 140, 143 and the movement of the intermediate disc spring 146.

Although the present embodiments have been described in relation to particular aspects thereof, many other variations and modifications and other uses will become apparent to those skilled in the art. It is preferred therefore, that the present embodiments be limited not by the specific disclosure herein, but only by the appended claims.

What is claimed is:

1. A torque reaction pulley mountable at an inertia crusher to form part of a drive transmission mechanism for rotational drive of an unbalanced mass body within the crusher, the pulley comprising:
    a drive input portion connectable to a motor to provide rotational drive to the pulley;

a drive output portion connectable to the mass body to transmit the rotational drive to the mass body; and a torque reaction coupling formed non-integrally with the drive input and output portions and having a first part anchored in coupled connection with the drive input portion and a second part anchored in coupled connection with the drive output portion so as to be positioned in the drive transmission pathway intermediate the drive input and output portions, the torque reaction coupling including an elastic component configured to transmit a torque to the mass body and to dynamically displace and/or deform elastically in response to a change in the torque resultant from rotation of the mass body within the crusher so as to dissipate the change in the torque at the crusher, wherein the elastic component includes at least one disc having spokes configured to deform via twisting about a rotational axis of the pulley in response to transmission of the torque through the pulley.

2. The pulley as claimed in claim 1, wherein the torque reaction coupling is attached to the drive input and output portions via releasable attachments such that the elastic component may be mounted and decoupled from the drive input and output portions.

3. The pulley as claimed in claim 1, wherein the torque reaction coupling is mounted at one end of the pulley.

4. The pulley as claimed in claim 2, wherein at least parts of the attachments are positioned externally at the pulley.

5. The pulley as claimed in claim 1, wherein the torque reaction coupling is connected indirectly to the drive output portion via at least one drive component forming a part of the pulley and configured to transmit the torque.

6. The pulley as claimed in claim 1, wherein the torque reaction coupling is connected indirectly to the drive input portion via at least one drive component forming a part of the pulley and configured to transmit the torque.

7. The pulley as claimed in claim 1, wherein the drive input portion includes an annular belt support component arranged to mount and positionally support a belt drive to extend at least partially around the belt support component.

8. The pulley as claimed in claim 1, wherein the drive output portion includes a race having an internally extending socket capable of mounting one end of a torsion bar or drive shaft demountably connectable to the pulley.

9. The pulley as claimed in claim 1, further comprising a first adaptor flange coupled between and connecting the drive input portion and the torque reaction coupling.

10. The pulley as claimed in claim 9, further comprising a second adaptor flange coupled between and connecting the drive output portion and the torque reaction coupling.

11. The pulley as claimed in claim 10, further comprising an adaptor shaft extending between and connecting the second adaptor flange and the drive output portion.

12. The pulley as claimed in claim 1, further comprising a plurality of discs stacked on top of one another via interconnecting members such that the spokes are arranged in series and/or in parallel in the drive transmission pathway intermediate to the drive input and output portions.

13. An inertia cone crusher comprising the pulley of claim 1.

* * * * *